United States Patent [19]
Groff et al.

[11] Patent Number: 4,671,456
[45] Date of Patent: Jun. 9, 1987

[54] AIR MODULATED IN DUCT HUMIDIFICATION AND EVAPORATIVE COOLING SYSTEM

[75] Inventors: Gordon S. Groff, Lancaster; Dean S. Herr, Willow Street, both of Pa.

[73] Assignee: Herrmidifier Company, Inc., Lancaster, Pa.

[21] Appl. No.: 783,428

[22] Filed: Oct. 3, 1985

Related U.S. Application Data

[63] Continuation-in-part of Ser. No. 689,766, Jan. 8, 1985, Pat. No. 4,572,428.

[51] Int. Cl.⁴ ............................................. B01F 3/02
[52] U.S. Cl. .................................. 236/44 A; 165/20; 62/171
[58] Field of Search ............. 165/20; 236/44 A, 44 B; 126/113; 62/171, 176.4

[56] References Cited

U.S. PATENT DOCUMENTS

| | | | |
|---|---|---|---|
| 1,858,725 | 5/1932 | Armstrong | 236/44 A |
| 2,314,892 | 3/1943 | Papulski | 236/44 A |
| 2,825,602 | 3/1958 | Rabbitt | 239/117 |

FOREIGN PATENT DOCUMENTS 2140912A 12/1984 United Kingdom ............ 236/44 A Primary Examiner—William E. Wayner
Attorney, Agent, or Firm—Brady, O'Boyle & Gates

[57] ABSTRACT

Water flow through air/water spray heads of an automatic in duct humidification and evaporative cooling system for buildings is modulated by a pneumatic control signal delivered to rear chambers of the system's spray heads through a pneumatic signal reversing relay connected with a pneumatic signal sending line in the pneumatic control section of the system.

6 Claims, 3 Drawing Figures

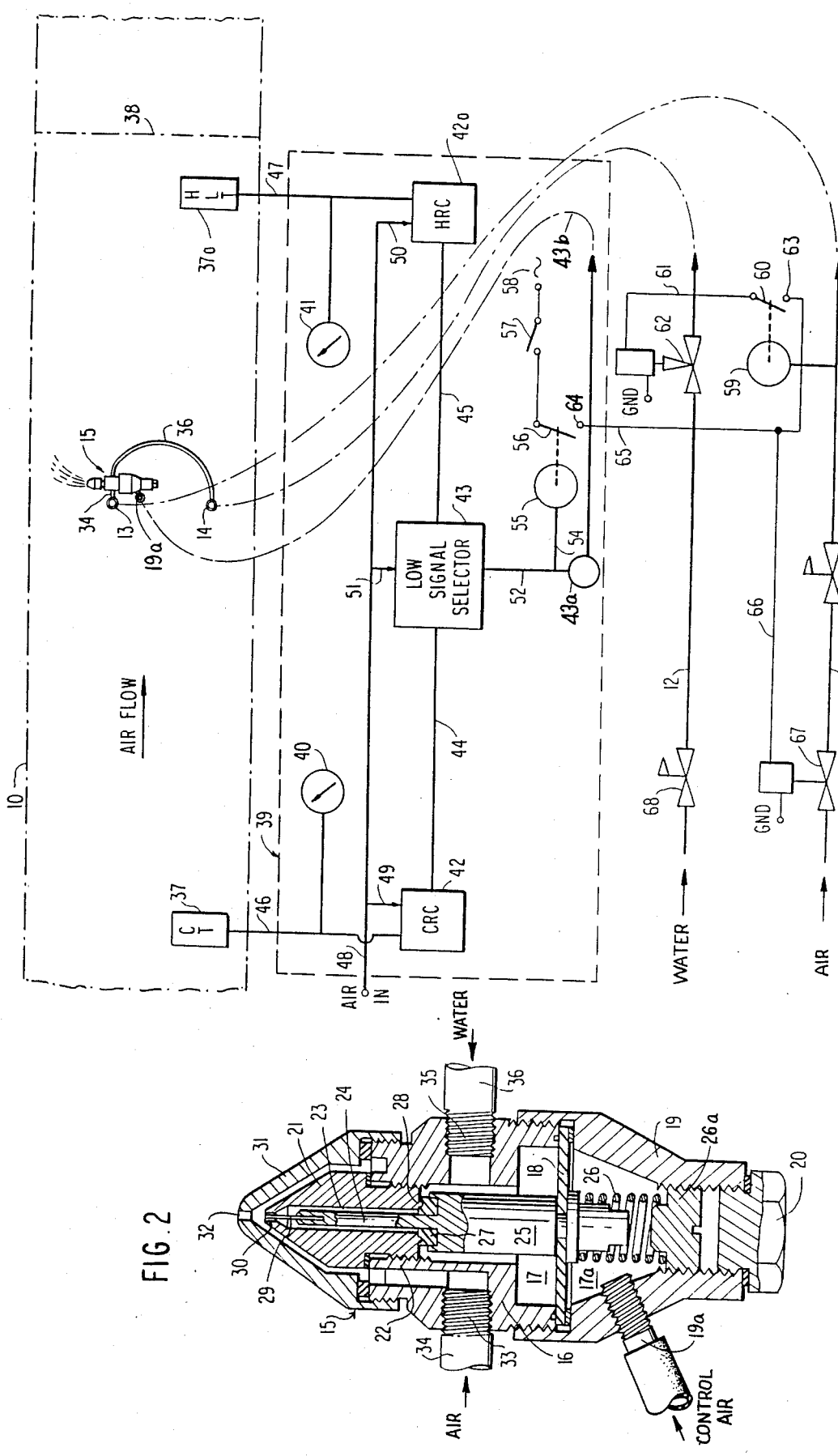

AIR MODULATED IN DUCT HUMIDIFICATION AND EVAPORATIVE COOLING SYSTEM

CROSS-REFERENCE TO RELATED APPLICATION

This application is a continuation-in-part of copending application Ser. No. 06/689,766, filed Jan. 8, 1985, now U.S. Pat. No. 4,572,428, for IN DUCT ATOMIZING HUMIDIFICATION AND EVAPORATIVE COOLING SYSTEM.

BACKGROUND OF THE INVENTION

The referenced prior patent application discloses a humidification and evaporative cooling system in which a modulating valve placed in the water supply line of the system is opened and closed in response to an air signal to restrict or increase the flow of water to in duct spray heads in order to satisfy humidification and evaporative cooling requirements.

The present invention improves on the system in the prior application by providing a new and better method of modulating the water discharge from the spray heads, whereby each spray head can be individually modulated. In the new technique, the modulation is accomplished by pressurizing the rear chamber of each air and water spray head with control air. The modulating water valve disclosed in the prior application is eliminated from the control section of the improved system in accordance with the present invention.

In accordance with the present invention, in response to a demand for humidity, the control section of the system operates to open the air and water solenoid valves in the air and water supply lines so that air and water can flow to the in duct spray heads. A separate pneumatic control system delivers a pneumatic pressure signal to a fitting connected in the rear chamber of each system spray head. As the pneumatic pressure signal to the rear of each spray head, behind its diaphragm, is increased or decreased, such signal will off-set or counteract a part of the water pressure acting on the forward side of the diaphragm. As the differential between the control air pressure and water pressure on the opposite sides of the spray head diaphragm is increased or decreased, it will cause the spray head plunger mechanism controlling the outlet of water to shift rearwardly or forwardly, thereby increasing or decreasing the flow of water through that particular spray head.

Therefore, once air and water flow to a spray head of the system is established, a decreasing pneumatic pressure signal will allow the plunger in each spray head to retract or open further, thereby permitting an increased flow of water through the spray head. As the system modulates downwardly, the control air pressure in the rear of the spray heads is increased, causing the plunger to move forwardly, in turn causing the water flow in the head to be restricted and the output of water from the head to be correspondingly diminished.

Among the advantages derived from this new method of air modulation of the system are the following:

(1) The previous method of modulating the system with a water modulating valve had an operational range of only 2-3 psi water pressure, whereas the improved method of modulation has an operational range of 10 psi control air pressure.

(2) The proportional air/water output from the spray heads can be much more precisely controlled, with no hysteresis, and absolutely positively shut off.

(3) The previous method of modulation was limited to a system having a minimum capacity of 120 lbs/hr of water, while the improved method is unlimited in the sense that a single spray head can be modulated, or a manifold containing 100 or more spray heads could be modulated.

(4) By adjustment of the tension of the plunger spring in the rear chamber of each spray head, the modulation range can be adjusted. For example, in a manifold having two heads, one head can be adjusted to operate from zero to full capacity over a range of 0-10 psi pneumatic signal input. The second spray head on the manifold could be adjusted to operate from zero to full capacity over the range of 10-20 psi pneumatic signal input. This enables the installation of a manifold which can have several stages of operation from a single 0-20 psi pneumatic signal input. In the prior method, multiple manifolds were required to achieve multiple stages of operation in the system.

(5) The improved method of modulation additionally allows the mounting of spray heads at different elevations while being supplied from the same control section of the system. Previously, all heads of a single system required mounting at exactly the same level, to avoid differences in water column pressure.

The system according to the prior referenced application is most suitable where large capacities of 200 lbs./hr. or more are involved. In such systems, the use of a water modulating valve may be preferable. However, generally speaking, systems having capacities under 200 lbs./hr. should be modulated pneumatically, and without the use of a water modulating valve, in accordance with the present invention.

Other features and advantages of the invention will become apparent to those skilled in the art during the course of the following detailed description. Generally speaking, the present invention has the same objectives and abilities set forth in the prior application for an in duct atomizing humidification and evaporative cooling system.

BRIEF DESCRIPTION OF THE DRAWINGS

FIG. 2 is an enlarged central vertical section taken through one spray head of the system.

FIG. 3 is a pneumatic-electrical system schematic view of the invention.

DETAILED DESCRIPTION

Figure 1:
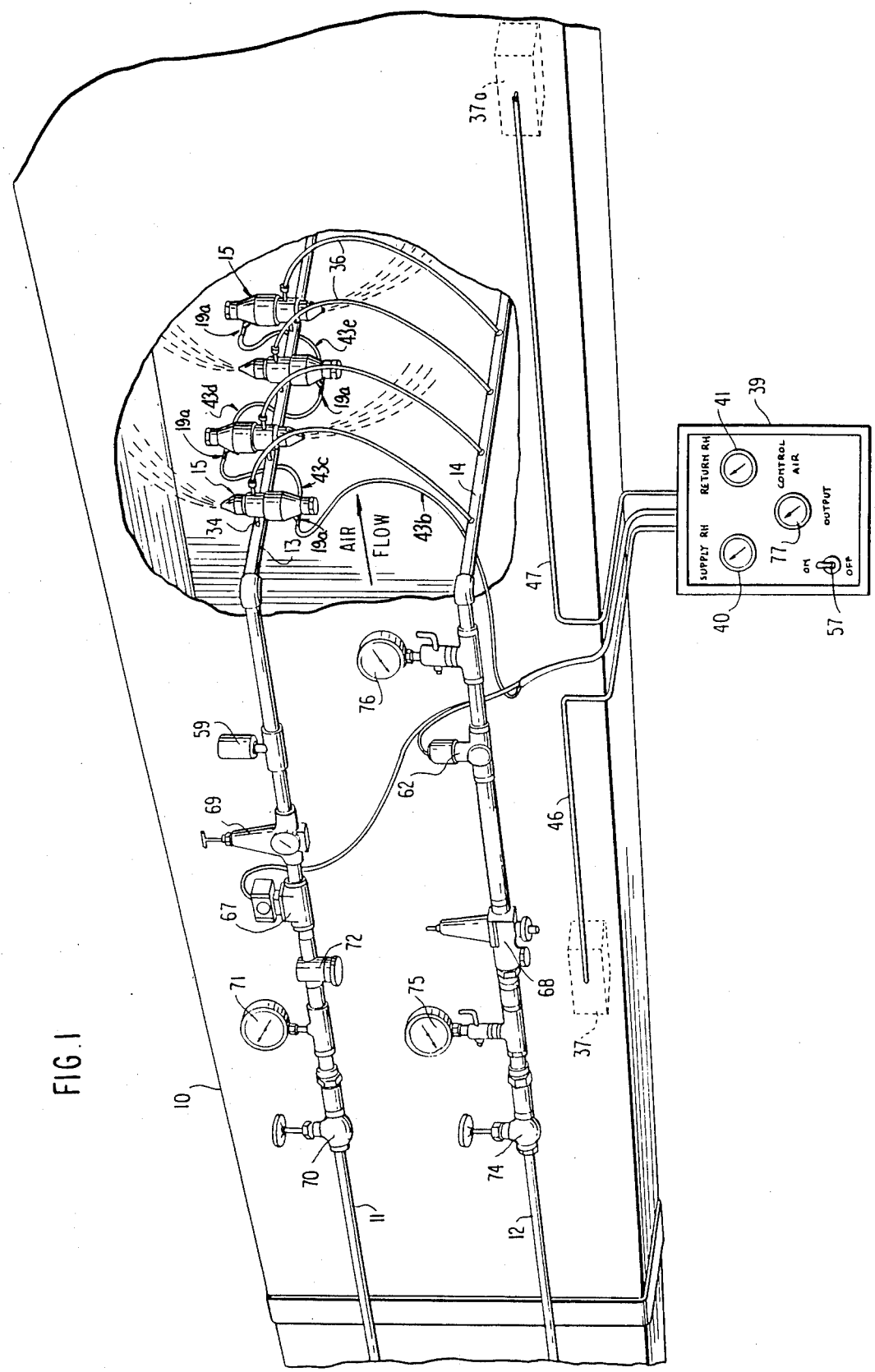
FIG. 1 is a fragmentary perspective view, partly broken away, of an in duct air modulated humidification and evaporative cooling system according to the present invention.

Referring to the drawings in detail wherein like numerals designate like parts throughout the same, FIG. 1 depicts the physical arrangement of the system according to the invention with relation to a main air supply duct 10 of a commercial or industrial building. A system pressurized air supply line 11 external to the duct 10 and extending along one side wall thereof supplies system air typically at 45 psi. Similarly, a system water supply line 12 externally of the duct 10 supplies system water typically at 45 psi. The air and water supply lines 11 and 12 deliver air and water, respectively, to an air manifold 13 and a parallel water manifold 14, disposed within the main air duct 10 and extending transversely across its air flow axis, preferably at right angles thereto.

The air manifold 13 mounts a required number of atomizing air/water spray heads 15, one of which is shown in detail in FIG. 2. The spray outlets of the heads 15 can be directed alternately in opposite directions as shown in FIG. 1, although in some cases the spray head outlets can be directed in the same direction, such as upwardly or downwardly. In any case, a sufficient number of the spray heads 15 is provided on the manifold 13 to span the width of the duct 10, so that humidifying and cooling sprays can be delivered across substantially its full width.

Referring to FIG. 2, each spray head 15 includes a body 16 having a forward chamber 17 spanned by an elastic diaphragm 18 secured by a rear clamping head 19 having a threaded closure plug 20. A rear control air chamber 17a is provided in the clamping head 19 on the rear side of diaphragm 18. A control air inlet fitting 19a is provided on the clamping head 19 and the purpose of this fitting will be fully described. A water nozzle 21 has threaded engagement with an extension 22 of the body 16, and has a bore 23 receiving a stem 24 of a central plunger 25, urged forwardly by a spring 26 behind the diaphragm 18. The tension of the spring 26 can be adjusted over a range to adjust the modulating range of the system, as will be further explained. A threaded spring tension adjusting screw 26a is provided, as shown. The plunger 25 carries a seal 27 which engages an opposing seat 28 of the water nozzle 21.

The stem 24 at its forward end carries a cleaning needle 29 which normally projects into a small water outlet orifice 30 of the nozzle 21. An air nozzle tip 31 having an outlet orifice 32 for air and water surrounds the nozzle 21 with the two orifices 30 and 32 coaxially aligned. The air nozzle tip 31 is threadedly engaged with the body 16, as shown.

Each spray head 15 has a system air inlet port 33 opening through one side thereof and being threadedly connected to an air supply branch 34 of the air manifold 13. The air inlet port 33 communicates with the outlet orifice 32 by flowing through the annular space between the water nozzle 21 and air nozzle tip 31. On its opposite side, each spray head 15 has a water inlet port 35 threadedly coupled to a water supply tube 36 having its opposite end coupled to the water manifold 14.

When pressurized system water is delivered by one of the tubes 36 to the inlet port 35 of a spray head 15, the pressurized water acts on diaphragm 18 and unseats the seal 27, allowing water to enter the bore 23 and to discharge through the orifice 30. Simultaneously, pressurized system air from one of the branches 34 enters the port 33 and passes to and through the orifice 32 along with entrained water exiting through the orifice 30. This results in a very fine atomization of water droplets entrained in air exiting through the orifice 32 of each spray head 15. The water droplets have an average size of approximately 7.5 microns. Such droplets rapidly evaporate to the gaseous state in the air duct 10 to raise the level of relative humidity therein, and provide evaporative cooling. The spray head 15 per se is preferably of the type disclosed in U.S. Pat. No. 2,825,602.

The system includes within the duct 10 a return air humidity sensor/transmitter 37, manufactured by Barber Coleman Co., Loves Park, Ill., No. HKS-2033, and a supply air humidity sensor/transmitter 37a of the identical type identified above. The return air humidity sensor/transmitter 37 is placed in the duct 10 upstream from the two manifolds 13 and 14, and the supply air humidity sensor/transmitter 37a is placed in the duct 10 downstream from the manifolds 13 and 14, and immediately ahead of the first bend or obstruction 38 in the duct 10, see FIG. 3.

A controls cabinet 39 mounted outside of the duct 10 contains two gages 40 and 41 which display, respectively, the return air (control) relative humidity and the supply air (high limit) relative humidity. These gages are identical and are manufactured by Barber Coleman Co. as No. AKS-9081.

Also within the cabinet 39 are a control receiver/controller 42 and a high limit receiver/controller 42a which are identical devices manufactured by Barber Coleman Co., No. RKS-1001.

Within the cabinet 39 is a low signal selector (comparator) 43, manufactured by Barber Coleman Co., No. AK-51642. The elements 42, 42a and 43 are interconnected by pneumatic signal lines 44 and 45. The elements 37 and 42 and 37a and 42a are connected by pneumatic signal lines 46 and 47.

System control air, preferably at 20 psi, enters the system through a control air supply line 48, having connections with the elements 42, 42a and 43, as indicated at 49, 50 and 51 in FIG. 3. Another pneumatic signal line 52 for the signal selected by the low signal selector (comparator) 43 leads from the element 43 to a reversing relay 43a within the cabinet 39, with which the line 52 is operatively connected.

Within the cabinet 39, the pneumatic signal line 52 is connected in parallel relationship to the reversing relay 43a and to a lateral pneumatic line 54, in turn connected to a pneumatic pressure-operated electric switch 55 having a contactor 56. A system on-off electrical switch 57 on the face of cabinet 39 has one terminal thereof connected with a 115 volt AC power supply 58, FIG. 3.

A companion pneumatic pressure-operated electric switch 59 having a contactor 60 is connected by a conductor 61 to the solenoid of a three-way water solenoid valve 62, connected in the water supply line 12. The three-way valve 62 is manufactured by Automatic Switch Co. (ASCO), Florham Park, N.J. as No. 8316C24. The switch 59 is manufactured by Automatic Switch Co. as No. PA10A/RE10A11. The switch 59 is connected in the air supply line 11 for operation by the pressure therein.

The terminals 63 and 64 of switch contactors 60 and 56 are interconnected by a conductor 65, having a branch conductor 66 leading to and connected with a two-way air solenoid valve 67, manufactured by Automatic Switch Co. as No. 8210D2. The two-way solenoid valve 67 is connected in the system air supply line 11. Also connected in the water supply line 12 is a water pressure regulator 68 manufactured by Watts Regulator Co., Lawrence, Mass. as No. U5LP10-35. An air pressure regulator 69 is connected in the air supply line 11 downstream from the air solenoid valve 67. The regulator 69 is manufactured by Penn Air Co., York, Pa. as Valve Model No. 11-002-069. All of the above-enumerated control components are standard commercial items. The pneumatic signal reversing relay 43a is manufactured by Barber-Coleman Company, Loves Park, Ill., Model No. AK50163.

Referring to FIG. 1, the air supply line 11 is preferably equipped with an upstream conventional manual shut-off valve 70, a pressure gage 71 and a filter 72 in the order and arrangement shown. None of these conventional elements plays a part in the functioning of the system controls shown in FIG. 3. Similarly, the water supply line 12 contains a shut-off valve 74, a pressure gage 75 and another standard gage 76 which is used in conjunction with the air compressor gage in setting up the system to assure proper pressure at the spray heads 15. A third gage 77 on the face of cabinet 39 displays the pneumatic pressure signal going to the reversing relay 43a.

As noted previously, the modulating water valve disclosed in the referenced prior application is eliminated in the present invention and the modulating function is taken over by the pneumatic control means directly. More particularly, the reversing relay 43a common to the several spray heads 15 is connected by an air line 43b to the air inlet fitting 19a of one endmost spray head 15 on the manifold 13, the fitting 19a being in communication with the rear control air chamber of the spray head, as previously described. The rear control air chambers 17a of the other spray heads 15 on the manifold 13 are serially connected through their air inlet fittings 19a by jumper air lines 43c, 43d, and 43e, etc.

OPERATION

With air flowing through the main duct 10 leading to various branch ducts of a building and with the described automatic air modulated humidification and evaporative cooling system components and their controls installed, and with system air and water at the proper pressures being delivered to the lines 11 and 12, and control air at the proper pressure being in the line 48, the system operates in the following manner.

The main on-off switch 57 is closed to supply 115 volts AC to the system, necessary to allow the pneumatic pressure-operated electric switches 55 and 59 to operate in connection with the solenoids of the three-way and two-way valves 62 and 67 in the water and air supply lines 12 and 11.

The return air humidity sensor/transmitter 37 sends a pressure signal via the pneumatic line 46 proportional to the relative humidity of the air which it is desired to control. This signal is displayed on the relative humidity gage 40. The same pneumatic signal is received by the return air receiver/controller 42 which in turn outputs a pneumatic signal through the line 44 which is proportional to the amount which the set point humidity setting selected on the receiver/controller 42 exceeds the actual humidity level being sensed by the sensor/transmitter 37. It will be understood that the return air receiver/controller 42 and supply air receiver/controller 42a are preset to enable the system to establish and maintain the desired humidity control with evaporative cooling.

Likewise, the supply air humidity sensor/transmitter 37a sends a pneumatic pressure signal through the line 47 proportional to the relative humidity of the air which the system is required to keep within allowable limits. This signal is displayed as relative humidity on the gage 41. The same signal is received by the supply air humidity receiver/controller 42a, which in turn outputs a pneumatic signal through the line 45 which is proportional to the amount which the set point selected on the receiver/controller 42a exceeds the actual humidity level being sensed at the supply air humidity sensor/transmitter 37a.

The two pneumatic signals from the return air and supply air receiver/controllers 42 and 42a are delivered to the low signal selector (comparator) 43. This device compares the two signals and outputs the lower of the two signals through the line 52 connected to the pressure controlled switch 55 and the reversing relay 43a. The pneumatic signal through the line 52 and lateral line 54 causes closing of the normally open contactor 56 of switch 55. The closing of the contactor, through the completed electrical circuit, opens the two-way air solenoid valve 67, which then supplies air at a pressure governed by the regulator 69 to the air manifold 13 and its spray heads 15.

When the pressure of the air delivered to the spray heads 15 exceeds a certain fixed value, the pneumatic pressure-operated electric switch 59 closes its normally open contactor 60 completing an electrical circuit to the solenoid of three-way solenoid valve 62 to open the latter for supplying water at a pressure governed by the regulator 68 to the spray heads 15. This water first enters the manifold 14 and then passes through the tubes 36 to the spray heads 15 which operate as previously described in connection with FIG. 2 of the drawings.

In accordance with the main subject matter and main improvement feature of the invention, the volumetric flow rate of water passing through the spray heads 15, in other words, the modulation of water flow through the spray heads, is effected directly by the pneumatic signal in the line 52, acting through the reversing relay 43a and the line 43b and jumper lines 43c to 43e, etc. leading to the inlet fittings 19a and the rear control air chambers 17a of the spray heads 15.

As the pneumatic signal to the rear chambers 17a of the spray heads increases or decreases, it will counteract the water pressure in the forward chamber 17 on the other side of diaphragm 18 to a greater or lesser degree. As the differential between the control air pressure and the water pressure increases or decreases, it will cause the plunger 25 to move rearwardly or forwardly, thus increasing or decreasing the water flow in the particular spray head 15.

An increasing pneumatic pressure signal through the line 52 results in a decreasing pneumatic pressure signal from reversing relay 43a in lines 43b . . . 43e, etc., which will cause the plunger 25 to move rearwardly, allowing increased water flow through the spray heads 15. With a decreasing pneumatic pressure signal in line 52, the system modulates downwardly, that is, the pressure of control air in lines 43b . . . 43e and in the rear chambers 17a is increased, causing the plungers 25 to move forwardly, thereby restricting water flow through the spray heads 15, whereby the water output from the spray heads is correspondingly diminished.

In the control system disclosed in the prior application, an increasing pneumatic pressure signal through the line 52 was utilized to open the modulating water valve, thereby increasing water flow to the spray heads 15. In the present invention, the increasing pneumatic signal in the line 52 is reversed by the relay 43a, and becomes a decreasing control signal in the rear chambers 17a of the spray heads 15. This arrangement allows the opposing or off-setting water pressure in the chambers 17 of the spray heads to increase the flow of water through the spray heads accordingly. In other words, the decreasing pneumatic signal in the chambers 17a will permit the plungers 25 to retract further, permitting increased water flow through and from the spray heads 15. As stated previously, when the system modulates downwardly, the pneumatic control pressure in the chambers 17a is increased causing the plungers 25 to move forwardly to thereby restrict and lessen the water flow through the spray heads as the plunger seal 27 moves closer to the seat 28.

In all other respects, the system operates in the same manner described in the prior referenced application and retains the advantages described in that application, plus the advantages set forth herein derived from the much more sensitive and precise direct air modulating arrangement.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. An air modulated humidification and evaporative cooling system comprising at least an air/water spray head having a pneumatic control chamber adapted for mounting within an area to be controlled, said air/water spray head having an air receiving passage and outlet means including an atomized spray outlet orifice, and a water receiving passage and outlet means including a water outlet orifice into the air outlet means, and a diaphragm element separating the water receiving passage and outlet means from said pneumatic control chamber, a valve stem in said water receiving passage and connected to one side of said diaphragm to operatively control the water outlet means, spring means in said pneumatic control chamber connected to the opposite side of said diaphragm from said valve stem to bias said valve stem to close said water outlet means, relative humidity sensor/transmitter means, external pneumatic modulating signal generating means operatively connected with said relative humidity sensor/transmitter means, control air delivery means connected with said pneumatic modulating signal generating means, pressurized water and pressurized air supply means connected with said water receiving passage and outlet means and said air receiving passage and outlet means respectively of said air/water spray head, and a pneumatic signal delivery line connected between said pneumatic modulating signal generating means and said pneumatic control chamber of said air/water spray head to deliver a varying pneumatic modulating signal from said pneumatic signal generating means in response to said relative humidity sensor/transmitter means to said pneumatic control chamber, whereby the pressure of a varying pneumatic modulating signal in said pneumatic control chamber and the biasing force of said spring means on said opposite side of said diaphragm is balanced against the pressure of water on said one side of said diaphragm to move said diaphragm in opposite directions to modulate the output of water by said air/water spray head and vary the water to air ratio from said atomized spray outlet orifice, wherein a decrease of pneumatic pressure in said pneumatic control chamber increases the water to air ratio from the atomized spray outlet orifice to decrease evaporation speed while increasing the total amount of water evaporated into the air, and an increase of pneumatic pressure in said pneumatic control chamber decreases the water to air ratio from the atomized spray outlet orifice to increase evaporation speed while decreasing the total amount of water evaporated into the air to maintain a required degree of relative humidity and evaporative cooling.

2. An air modulated in duct humidification and evaporative cooling system comprising a plurality of air/water spray heads adapted for mounting within and across the air flow axis of an air supply duct, each air/water spray head having a pneumatic control chamber, in duct relative humidity sensor/transmitter means, external pneumatic modulating signal generating means operatively connected with said in duct relative humidity sensor/transmitter means, control air delivery means connected with said pneumatic modulating signal generating means, pressurized water and pressurized air supply means connected with said plurality of air/water spray heads, means connected between said pneumatic modulating signal generating means and said pneumatic control chambers comprising a pneumatic signal delivery line leading to the control chamber of one air/water spray head and jumper pneumatic signal delivery lines connected serially between said one air/water spray head and the control chamber of the other air/water spray heads in said plurality, whereby a varying pneumatic modulating signal in said pneumatic control chambers can modulate the output of water by said plurality of air/water spray heads to maintain a required degree of relative humidity and evaporative cooling within an air supply duct.

3. An air modulated in duct humidification and evaporative cooling system as defined in claim 2, and a pneumatic signal reversing relay connected in said pneumatic signal delivery line leading to the control chamber of said one air/water spray head.

4. An air modulated in duct humidification and evaporative cooling system as defined in claim 2, and pneumatic pressure-operated electrical means connected between said pneumatic modulating signal generating means and said pressurized water and pressurized air supply means.

5. An air modulated in duct humidification and evaporative cooling system comprising a plurality of air/water spray heads each having a water receiving passage and outlet means, an air receiving passage and outlet means and a pneumatic control chamber isolated from the water receiving passage and outlet means by a diaphragm element, pressurized water and pressurized air delivery manifold means connected with said water and air receiving passage and outlet means of said spray heads, external pneumatic signal generating means delivering a modulating pneumatic signal to said pneumatic control chamber to each air/water spray head to modulate the output of water from each spray head to satisfy varying relative humidity and evaporative cooling demands in a building air supply duct, and in duct separated return air and supply air relative humidity sensor/transmitter means, each operatively connected with said pneumatic signal generating means.

6. An air modulated in duct humidification and evaporative cooling system as defined in claim 5, and pneumatic pressure-operated electrical means connected between the pneumatic signal generating means and said pressurized water and pressurized air delivery manifold means.

* * * * *